United States Patent [19]
Farrell

[11] 3,765,809
[45] Oct. 16, 1973

[54] APPARATUS FOR MAKING PLASTIC ARTICLES OF IRREGULAR DESIGN

[76] Inventor: John J. Farrell, 40 Abby Ln., Greenbrook, N.J. 08812

[22] Filed: Mar. 10, 1972

[21] Appl. No.: 233,432

[52] U.S. Cl. ............... 425/109, 425/92, 425/130, 425/145, 425/308, 425/325, 425/464, 264/148, 264/245, 156/501
[51] Int. Cl. .................. B29c 27/14, B29d 9/00
[58] Field of Search ................. 156/500, 501; 425/325, 308, 409, 92, 130, 131, 145, 382, 464, 72; 264/75, 40, 148, 245; 118/313

[56] References Cited
UNITED STATES PATENTS

| | | | |
|---|---|---|---|
| 2,485,323 | 10/1949 | Schwartz | 264/245 |
| 3,089,196 | 5/1963 | Knapp et al. | 264/212 X |
| 3,127,298 | 3/1964 | Nalle, Jr. | 156/500 X |
| 3,240,655 | 3/1966 | Voelker | 156/501 |
| 3,328,845 | 7/1967 | Ludwig | 425/129 X |
| 3,377,964 | 4/1968 | Bell et al. | 425/382 X |
| 3,405,664 | 10/1968 | Kajitani | 425/382 X |
| 3,451,102 | 6/1969 | Chomitz et al. | 425/464 |
| 3,505,707 | 4/1970 | Villain | 425/109 |
| 3,537,929 | 11/1970 | Keith et al. | 425/109 X |
| 3,706,825 | 12/1972 | Hall et al. | 264/75 |

Primary Examiner—Robert L. Spicer, Jr.
Attorney—Sandoe, Hopgood & Calimafde

[57] ABSTRACT

For making molded articles, such as open panels with decorative cross pieces and outside border frames, this invention has nozzles from which molten material is extruded onto a moving surface on which the material cools and hardens. The nozzles are moved with respect to the moving surface and to one another during the extruding operation to lay down bands that extend in various directions and that contact with one another while molten to merge into a one-piece panel. Repetitive connected paels are formed and are cut apart by a flying cutoff.

11 Claims, 12 Drawing Figures

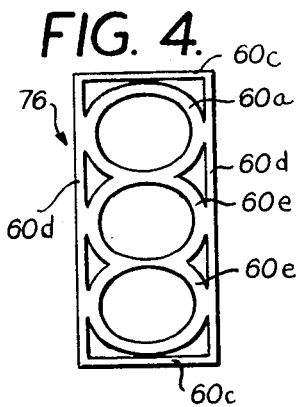
FIG. 4.
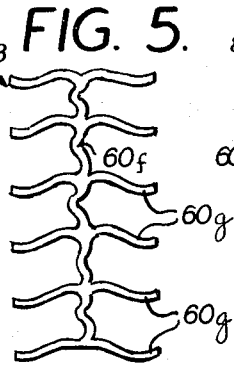
FIG. 5.
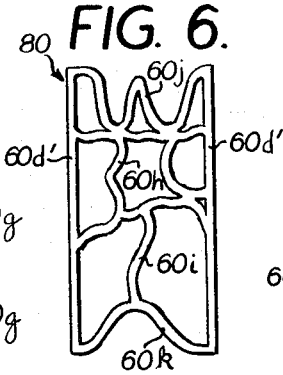
FIG. 6.
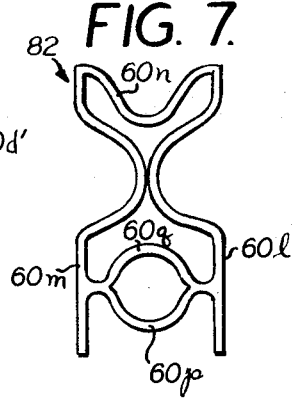
FIG. 7.
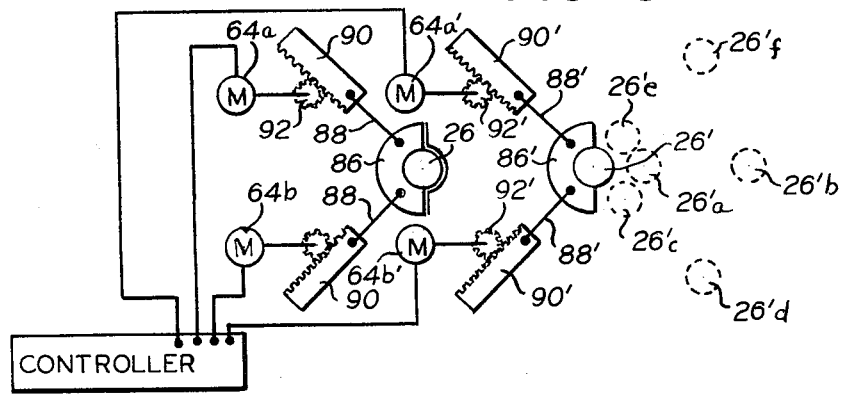
FIG. 8.
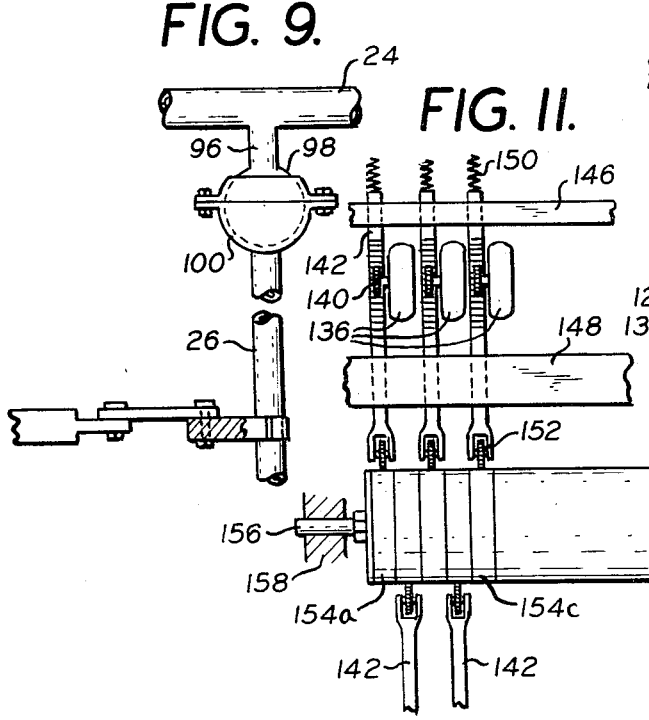
FIG. 9.
FIG. 10.
FIG. 11.
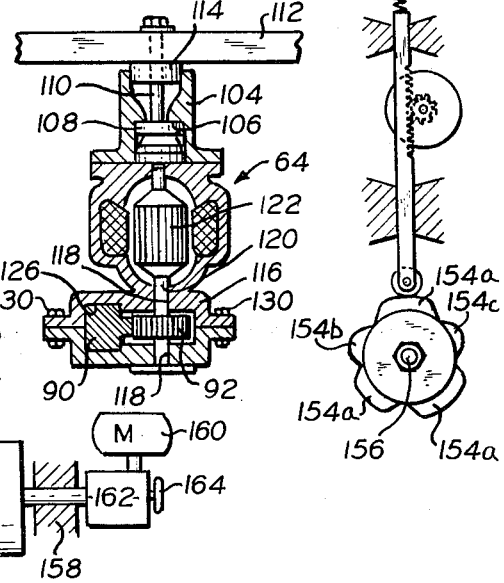
FIG. 12.

APPARATUS FOR MAKING PLASTIC ARTICLES OF IRREGULAR DESIGN

BACKGROUND AND SUMMARY OF THE INVENTION

It is an object of this invention to form panels of large size such as used for decorating doors, windows and for standing decorative panels that are used for interior decorating and similar uses; and to make irregular designs without the use of a mold.

This invention has extruder means with a plurality of nozzles that are moved relative to one another while extruding material onto a support; and the nozzles are moved with a controlled movement to trace out the desired design. In the preferred construction, the surface on which the material is extruded is a moving surface so that the designs can be of extensive length suitable for use on doors or window openings and for decorative panels used in rooms and reaching substantially the full distance from a floor to a ceiling.

The movement can be programmed to produce repetitive designs which are cut apart while moving with the surface on which they are extruded and as soon as the material is cool enough for cutting. Panels can be of any irregular design or made with straight sides and ends to form a rectangular outline with cross members as desired. If desired, the moving surface can become part of the article produced.

In the preferred construction the nozzles are at the lower ends of pipes or tubes that are connected with a manifold by iniversal joints which let the nozzles swing in any direction over the moving surface on which the molten material from the nozzles is extruded. The nozzles are moved by power thrustors at angles to one another, preferably at right angles, to get a resultant movement in any desired direction. The thrustors are near the joint to gain a substantial mechanical advantage that moves the nozzle at least two times as far as the movement of the thrustors.

The illustration of the extruding apparatus and the programmed controls is diagrammatic and very much simplified for clearer illustration.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views;

FIGS. 4–7 are views of panels made by the apparatus shown in FIGS. 1–3;

FIG. 8 is a diagrammatic view showing power driven thrustors for moving the nozzles in different directions in response to the operation of a controller;

FIG. 9 is a fragmentary detail view showing the universal connection between a supply manifold and one of the pipes to an extruder nozzle, and showing the connection of a thrustor to the pipe;

FIG. 10 is a diagrammatic sectional view of the motor of one of the thrustors shown in FIGS. 8 and 9;

FIG. 11 is a diagrammatic view of the controller for the thrustors; and

FIG. 12 is an end view of the control mechanism shown in FIG. 11.

DESCRIPTION OF PREFERRED EMBODIMENT

Figure 1:
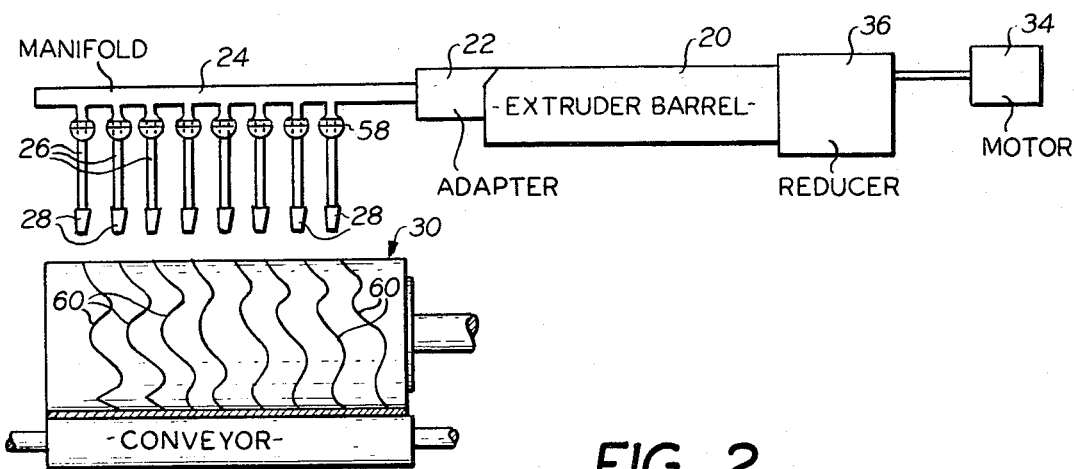
FIG. 1 is a diagrammatic elevation view of apparatus for extruding material on a moving surface in accordance with this invention.

FIG. 1 shows extruder apparatus including a barrel 20 from which molten material, preferably plastic, is discharged through an adaptor 22 into a manifold 24 having branch piping 26 leading to nozzles 28 from which the material is extruded onto a moving receiving surface 30. The extruder barrel contains the usual feed mechanism driven by a motor 34 operating through a speed reducer 36. The construction of the extruder and the driving mechanism for it are conventional and no description of them are necessary for a complete understanding of this invention.

The moving receiving surface illustrated in the drawing includes a roll 40 of sheet material 42 which passes over a supporting roll 44 located under the nozzles 28. The sheet material 42 travels along a roller conveyor 46 to a shear 48 which is preferably a flying shear capable of cutting the sheet 42 and the plastic design or panel on the sheet while the sheet and the plastic continue to move with a uniform motion.

The sheet material can be casting paper and in such case does not become part of the article produced. The sheet material can be a plastic web to which the extruded material fuses and in such case the sheet does become part of the article and forms a web extending across and closing what would otherwise be open spaces between the extruded bands. The thickness of the web is selected depending upon what web thickness is desired in the final panel.

Figure 2:
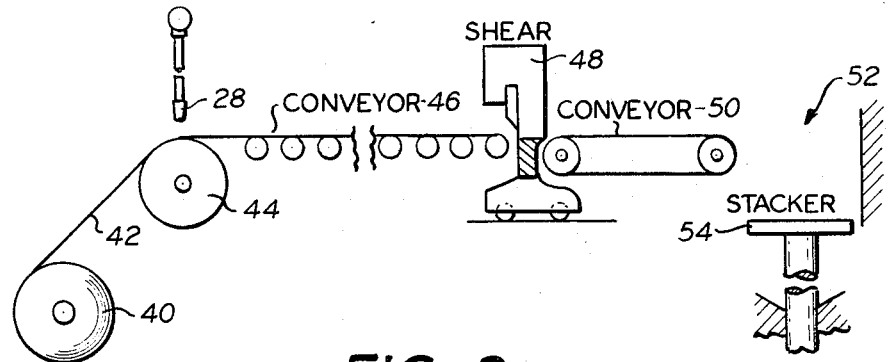
FIG. 2 is a diagrammatic view, on a reduced scale, showing a side view of a portion of the apparatus shown in FIG. 1 and showing a conveyor for the moving surface and a flying cutoff for separating repetitive patterns from one another.

Beyond the shear 48 the severed sections of the sheet 42, together with the plastic which has been deposited on it, travels along an endless belt conveyor 50 to a stacker station 52 where there is a support 54 on which the successive lengths of sheet and plastic are stacked after cutting. The conveyors, shear and stacker are of conventional construction and are illustrated diagrammatically in FIG. 2.

The piping which connects the nozzles 28 to the extruder barrel 20 includes universal connections 58 by which the individual nozzles and their connected runs of piping 26 are joined to branches of the manifold 24 of the piping. These universal connections permits the nozzles to swing in any direction; that is, either in the direction in which the moving receiving surface 30 travels or in a direction transverse to the movement of the moving receiving surface 30. Each nozzle 28 has sufficient movement to reach the portion of the surface 30 onto which the next adjacent nozzle on each side discharges plastic. These universal connections 58 will be explained in connection with other figures of the drawing.

FIG. 1 shows bands 60 of plastic material extruded onto the surface 30 in accordance with certain ornamental designs, and the designs depend upon the relative movement of the individual nozzles 28 with respect to the moving surface 30. Each of the bands 60, shown in FIG. 1, is discharged from a different one of the nozzles 28 and in the design shown in FIG. 1 none of these bands touch or overlap one another.

The nozzles 28 are moved, in accordance with a patterned control which will be explained in connection with other figures, by motors 64 (FIG. 3) operating through motion-transmitting connections indicated generally by the reference character 66. These motion-transmitting connections 66 are connected with the piping 26, preferably at a location nearer to the universal joints 58 than to the nozzles 28. Thus any motion imparted to the motion-transmitting connections 66 by the motor means 64 is capable of producing a substantially greater movement of the nozzles 28 because of the leverage obtained by having the motion-transmitting connections 66 nearer to the fulcrums about which the pipings 26 swing.

Figure 3:
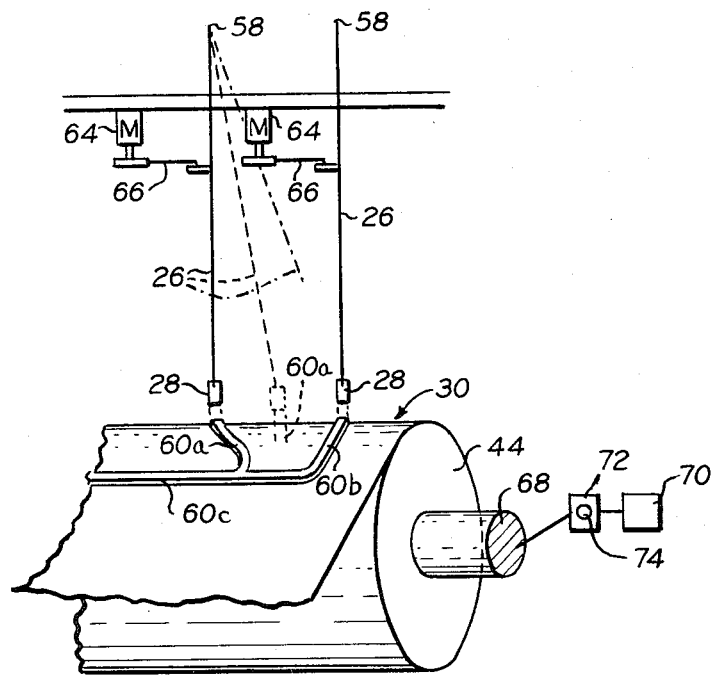
FIG. 3 is a greatly enlarged, fragmentary, diagrammatic view showing the way in which the nozzles are operated by power thrustors to move them over the moving surface of the apparatus shown in FIGS. 1 and 2.

FIG. 3 shows the left hand piping 26 in full lines, this being in the position occupied when the piping 26 is vertical. The same left hand piping 26 is shown in dotted lines swung to the right so as to deposit a band 60a further to the right on the surface 30. A more extreme position of the left hand piping 26 is shown in broken lines and with the piping 26 in this broken line position, the band 60a is far enough to the right to intersect the band 60b from the right hand nozzle in FIG. 3.

Thus by controlling the operation of the motor means 64 with separate programming of the individual motor means, the extrusion nozzles 28 can be made to lay down bands 60 extending in any direction and with any correlation with each other on the surface 30. FIG. 3 shows the bands 60a and 60b merging in a single transverse band 60c which is at right angles to the edge of the moving receiving surface 30. Such a band is formed by combined action of the different nozzles 28, each nozzle laying down a portion of the transverse band 60c within the range that the nozzle can swing transversely of the moving surface 30. To get a line or band, such as the band 60c, extending at right angles to the edge of the surface 30, it is necessary that the nozzles 28 swing to the left while advancing at the same time in the direction of movement of the surface 30 at the same speed as the surface 30 moves.

The roller 44 is supported by an axle 68 and it is driven by a motor 70 through reduction gearing 72 having an adjustment 74 for regulating the speed of the roller 44 and the resulting speed of the surface 30.

FIGS. 4, 5, 6 and 7 show decorative designs that can be formed on the moving surface by plastic extruded from the different nozzles. FIG. 4 shows bands 60c extending transversely of the panel design and formed as described in FIG. 3. The panel design 76 of FIG. 4 also has side bands 60d which extend in the same direction as the movement of the surface on which the plastic is extruded. These bands 60d are formed by maintaining the nozzles which extrude the bands stationary while the moving surface passes under them.

Circular or elliptical bands 60e are formed within the rectangular outline of the panels 60c and 60d. These oval bands 60e are formed by cooperative action of different nozzles which operate with combined transverse and longitudinal movement correlated with the movement of the surface on which the plastic is extruded to produce the shapes shown. These bands 60e touch the straight bands and merge with them to form a one-piece plastic panel of the ornamental design illustrated. Since the material extruded from the nozzles is molten, any bands which touch one another merge together to form a one-piece plastic construction when the plastic has cooled.

FIG. 5 shows another ornamental design 78 which consists of a wavy center band 60f with wavy transverse bands 60g extending from both sides and with no longitudinally extending band at the outer end of the transverse band 60g.

FIG. 6 shows another ornamental design 80 which has longitudinal side bands 60d' corresponding to the side bands 60d of FIG. 4, and the ornamental panel 80 has various inner bands 60h, 60i with wavy end bands 60j and 60k at opposite ends of the panel. Other intermediate bands are shown without reference characters.

FIG. 7 shows another ornamental panel 82 which has a more symmetrical pattern than the panel 80 and which has side bands 60l and 60m, which are longitudinal throughout a portion of their length, and other bands 60m and 60p.

The number of ornamental designs that can be made by the operator for this invention is unlimited and FIGS. 4–7 are believed to be sufficient to show the symmetry or lack of summetry that is possible in the designs. A design such shown in FIGS. 4 and 5 can be made as separate panels with no connection between the successive panels that are formed on the moving surface. The panels can be separated by temporarily stopping the flow of material from the extrusion nozzles. However, many designs which lend themselves to a cutting apart by the flying shear, such as the pattern shown in FIG. 7, can be formed continuously and repetitively on the moving surface with the successive panels joined together and formed without ever stopping the flow of material from the extrusion nozzles. However, even the pattern shown in FIGS. 6 and 7 can be extruded as separate independent patterns on the moving surface, if desired.

FIG. 8 is a diagrammatic showing of the mechanism by which the nozzles are moved by the motor means 64. There are two motors 64a and 64b connected with each of the sections of piping 26. These connections include a collar 86 secured to the piping 26 and links 88 connecting the collar with racks 90 which mesh with pinions 92 on the armature shaft of the motors 64a and 64b. It will be understood that the racks 90 slide in bearings but no bearings are shown in FIG. 8 in order to provide clearer illustration. FIG. 8 shows another section of piping 26' connected with motor means comprising a motor 64a' and a motor 64b'. These motors 64a' and 64b' are connected with the piping 26' by motion-transmitting connections as already described for the motors 64a and 64b, and corresponding parts are indicated by the same reference characters with a prime appended.

When the motors 64a' and 64b' rotate simultaneously at the same speed, the pinions 92' move the racks 90' at the same speed and thus the collar 86' and its connected piping section 26' swing longitudinally into successive positions 26a' and 26b'. If the motor 64a' operates with no power supplied to the motor 64b', the piping 26' will be moved successively into the positions 26c' and 26d'. This will require that the rack 95 of the motor 64b' swing about the axis of one of the pinions 92' and that it be pulled along as necessary to prevent the links 88' of the motor 64b' from pulling the piping 26' out of its course. If necessary, the motor 64b' can be programmed to move its rack 90' only to the extent necessary to permit the piping 26' to move along the straight line indicated by the successive positions 26c' and 26d'.

In similar manner the motor 64b' can be operated to move the piping 26' into successive positions 26e' and 26f' with the motor 64a' programmed to permit this straight line movement of the piping 26' or with the motion-transmitting connections from the motor 64' merely moved by pull of the power supplied by the motor 64b', dependent upon the amount of friction involved and other factors respecting angularity of the links 88' and of the racks.

It will be evident, however, that the piping 26' can be moved into any desired position, within the range permitted by the length of the rack 90'. The movement of the piping 26' which represents the nozzles in FIG. 8 is much greater than the actual travel of the racks 90' because of the greater distance of the nozzles from the universal fulcrum connection on which the piping 26' swings as already explained in connection with FIG. 3.

The actual distance that any nozzle is designed to move over the surface on which the plastic is extruded depends upon the distance that the nozzle can move away from the surface without adversely affecting the width of the band of plastic which the nozzle extrudes onto the surface. As the nozzle moves into a position where the piping is at an angle to the surface on which the plastic is extruded, the distance from the nozzle to the receiving surface is increased somewhat. Extruded bands are not, of course, of the width of the nozzle since some slump of the plastic material can be provided for as desired.

Various plastic materials can be used for this invention with such plasticizer as may be desirable to obtain the necessary physical characteristics. Suitable plastics are styrene, polyethylene, acrylic butyl styrene, polyvinyl chloride, acetate, and nylon. The panels formed can be stiff or flexible depending upon the degree to which the material is plasticized.

Instead of extruding the material onto a casting paper to make a panel with open spaced between bands, the material can be extruded onto a sheet which forms a web or membrane that is a part of the final panel, the membrane being made of plastic material compatible with the material extruded on it and of a melting point which will cause the extruded material to bond to the web or membrane. The sheet material can be transparent, translucent or opaque.

The expressions "web" and "membrane" are used herein to indicate an extent of sheet material, usually imperforate, from one band to another of the ornamental design and is not intended to indicate the thickness of the material. It can be as thin or thick as desired for the purposes for which the panel is intended. For example, if the panel is intended as a door, then the web material may be thick enough to provide necessary strength to prevent breakage in ordinary service to which a door is exposed. On the other hand, if the panel is intended merely for decorative effects and is used with lights behind it, the web may be made of sheet material that is quite thin and transparent or possibly translucent to permit passage of light from behind the decoration into the room.

FIG. 9 is a diagrammatic showing of the connection of one of the sections of piping 26 to the manifold 24. There is a short section 96 extending as a branch from the fixed manifold 24 and there is a surface 98 which is preferably integral with the branch 96 having a surface which is a portion of a sphere. A shell 100 of spherical inside contour fits over the spherical surface 98 to form what is in effect a "ball and socket" connection between the piping 26 and the branch 96 of the manifold 24 of the piping system. The piping 26 communicates with the interior of the shell 100 and the surface 98 is of limited extent so that the shell 100 can swing in any direction about the center of curvature of the spherical surfaces 98 and 100.

FIG. 10 is a diagrammatic showing of part of the motor means. This figure shows the motor 64 connected to a cylindrical bracket 104 having an inside shoulder 106 which rests on a collar 108 on a bolt 110 extending downward from a fixed support 112. The bolt 110 has another collar 114 immediately under the support 112 so that there are two bearings, axially spaced from one another along the brackets 104 for providing rotation of the brackets while maintaining the brackets in a vertical position with respect to the fixed support 112. The motor 64 rotates as a unit with the bracket 104 about the axis of the bolt 110.

At the lower end of the housing of the motor 64 there is a bearing unit 116, preferably an integral part of the housing of the motor, with bearings 118 for an armature shaft 120 extending downward from the motor armature 122. The pinion 92 is secured to the armature shaft 120 and is located in a chamber in the bearing element 116. The rack 90 slides in bearings 126 provided by the upper and lower halves of the bearing element 116, these halves being connected together by fastening means such as bolts 130.

FIGS. 11 and 12 are diagrammatic showings of mechanisms for programming the operation of the motors 64. There is a separate master 136 for each one of the motors 64. Rotation of the master motors 136 into any desired position causes the corresponding slave motors 64 to move into the corresponding positions.

The master motors 136 are each equipped with a pinion 140 which meshes with the teeth of a rack 142. These racks 142 slide in bearings in spaced bearing elements 146 and 148. A spring 150 urges the rack 142 downward. At the lower end of each of the racks 142 there is a follower 152 which runs on a different one of cams 154a through 154e. Only five such cams are shown in FIG. 11 but it will be understood that there are as many cams as there are motors to be controlled.

The cams 154a–154e are assembled together on a cam shaft 156 which rotates in spaced bearings 158 and which is driven by a motor 160 through reduction gearing 162 which is adjustable to change the speed by an adjustment 164.

Thus the speed of rotation of the cam shaft 156 can be adjusted, in proportion to the speed of movement of the surface on which the plastic is extruded, by adjusting the reduction gearing 162 by means of the adjustment 164. The cams 154a through 154e are each designed for the particular motion which is necessary for the nozzle which is controlled by the respective cams. In FIG. 11 the construction is shown with some of the racks 142 extending from one side of the cam assembly and others of the racks extending from the other side. This construction is used in order to cut down the necessary length of the cam assembly and the only difference that the location of the rack makes is that the cam for the particular rack must be properly oriented as to phase angle when the cams are assembled on the cam shaft.

The preferred embodiment of the invention has been illustrated and described, but changes and modifications can be made and some features can be used in different combinations without departing from the invention as defined in the claims.

What is claimed is:

1. Apparatus for extruding designs and panels including in combination an extruder, a moving receiving surface, nozzles through which material from the extruder is extruded onto said receiving surface, piping connections between the extruder and the nozzle providing universal movement of the nozzle across the area of the moving surface on which material is to be extruded and control means for said universal movement.

2. The apparatus described in claim 1 characterized by there being a plurality of nozzles and a common manifold through which all of the nozzles receive hot plastic material from the extruder, said piping connections for the nozzles being movable independently of one another and being movable independently in different directions from other nozzles at the same time.

3. The apparatus described in claim 2 characterized by the moving receiving surface being a plastic web on which the nozzles extrude, bands of plastic at temperatures which cause the bands to fuse to the web so that the web becomes a part of the final product and extends across what would otherwise be open space between the bands.

4. The web described in claim 3 characterized by the web being a continuous imperforate membrane that covers all of the space between the bands that are extruded thereon.

5. The apparatus described in claim 2 characterized by the control means including different motor means for moving different nozzles with respect to one another and for operating the different motor means independently of one another.

6. The apparatus described in claim 2 characterized by each of the different nozzles being in positions to extrude a band of material along a controlled path on the moving surface over a given area of the moving surface with the band extending longitudinally of the moving surface when the nozzle is stationary or is moving in the same or in opposite direction to the movement of the moving surface, and to extrude a band of material extending transversely of the direction of movement of the moving surface when the nozzle has transverse movement relative to the moving surface, different nozzles being positioned and movable with respect to one another to reach the given areas of the moving surface over which other nozzles extrude material whereby two nozzles can extrude material to the same band on the moving surface.

7. The apparatus described in claim 2 characterized by each of the nozzles having control means connected with two motor means, the first of which shifts the nozzle in a direction transverse of the direction of movement of the moving surface, and the other of which shifts the nozzle in a different direction that is transverse of the moving surface and that is also transverse of the direction in which the nozzle is moved by the first motor means.

8. The apparatus described in claim 7 characterized by the piping connections extending down toward the moving surface and comprising long pipes, universal connections joining the respective pipes to their source of material to be extruded, the motor means being thrustors that move at right angles to each other, the thrustors being connected with the pipes at locations nearer to the universal connection than to the nozzles whereby movement of the nozzles is greater than twice the corresponding movement of the thrustor.

9. The apparatus described in claim 7 characterized by the control means including programming means for controlling the motor means to extrude on the moving surface bands extending in any direction and in straight, curved and changing directions to form open panels with bands of extruded material that merge at connecting regions of ornamental design.

10. The apparatus described in claim 9 characterized by a cut-off station located at a substantial distance from the nozzles, the distance being correlated with the speed of movement of the moving surface and with the temperature and mass of the extruded material so that each panel cools and hardens on the moving surface sufficiently to be cut from other panels, a flying cut-off at the cut-off station for cutting off successive panels as they reach the cut-off station, and a stacker station beyond the flying cut-off.

11. The apparatus described in claim 7 characterized by nozzles for extruding straight and parallel bands at opposite sides of a panel, the control means having connections for moving nozzles along a transverse course with a component of movement in the direction of movement of said moving surface to form straight and parallel bands at the ends of each panel at right angles to the straight and parallel side bands, and control means for moving other nozzles to extrude bands within the limits defined by said straight bands and that connect with some of the straight bands to form ornamental decorative effects within the panel.

* * * * *